J. KENNEDY.
WALL SOCKET.
APPLICATION FILED MAR. 27, 1915.

1,234,179.

Patented July 24, 1917.

WITNESSES:
R. H. Barbour
F. Graves

INVENTOR
Joseph Kennedy
BY
E. W. Marshall
ATTORNEY

UNITED STATES PATENT OFFICE.

JOSEPH KENNEDY, OF NEW YORK, N. Y., ASSIGNOR TO THE CLEMENTS COMPANY, OF NEW YORK, N. Y., A CORPORATION OF NEW YORK.

WALL-SOCKET.

1,234,179.        Specification of Letters Patent.        Patented July 24, 1917.

Original application filed August 14, 1913, Serial No. 784,672. Divided and this application filed March 27, 1915. Serial No. 17,322.

*To all whom it may concern:*

Be it known that I, JOSEPH KENNEDY, a citizen of the United States of America, and a resident of New York, county and State of New York, have invented certain new and useful Improvements in Wall-Sockets, of which the following is a specification, reference being had to the accompanying drawings, forming a part thereof.

My invention relates to wall sockets or plugs such as are inserted in walls, floors or other structures of material which will not readily receive and hold the threads of a bolt, for the purpose of forming anchorage members for bolts or the like, and its object is to provide a simple device which will be securely held in a hole into which it is driven.

This and other objects and advantages of my invention will appear in the following specification, in which the invention will be described and its novel features will be set forth in appended claim.

Referring to the drawings.

10 is a wall of concrete for example, in which is drilled a hole 11 slightly deeper than the length of the socket, and of a diameter to make a driving fit for the socket.

Figure 1:
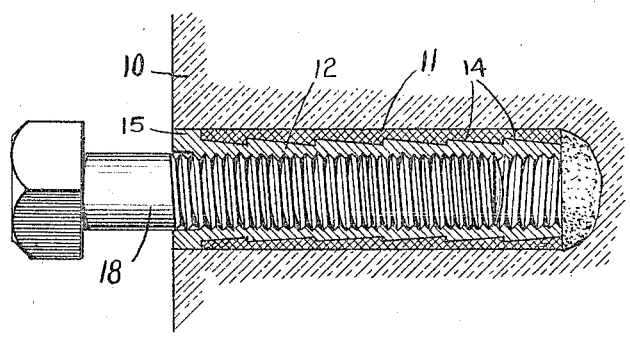
Figure 1 is a transverse section of a wall having a hole drilled therein with a bolt screwed into one of my novel wall sockets within the hole.
Figure 2:
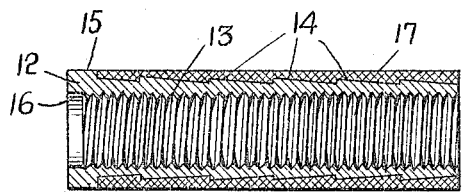
Fig. 2 is a longitudinal section of the socket of Fig. 1.
Figure 3:
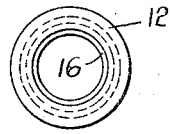
Fig. 3 is an end elevation of the same.

The socket comprises a shell 12 of hard metal having a cylindrical bore which is threaded as shown at 13 in Fig. 2 and has an outer surface which is provided with steps 14 and an annular flange 15 at its outer end. A soft metal cover sleeve 17 surrounds the stepped outer surface of the hard metal sleeve.

The socket may be driven into the hole, and the recess formed by a counterbore 16 prevents injury to the threads 13 from the blows of the hammer. The soft metallic cover sleeve 17 has a tendency to slip on the stepped surface of the shell as the device is being driven into the hole and thereby becomes jammed between the shell and the surface of the hole 11, and the flange 15 assists in this part of the operation as it prevents the sleeve moving off from the shell. When thus in place the socket forms a secure anchorage for a bolt 18 or other threaded device. The soft metal cover sleeve is internally stepped to fit the stepped surface of the shell as shown in the drawings.

This application is a divisional of application filed by me August 14, 1913, Serial No. 784,672, and assigned to The Clements Co., a corporation of New York.

What I claim is:

A wall socket comprising a hollow circumferentially continuous shell of hard metal with its exterior tapered in a plurality of wedge-like steps toward its inner end, surrounded by a similar sleeve of soft metal with its interior tapered in a plurality of steps toward its inner end, the outer surface of said soft metal sleeve being adapted to engage the rough surface of a hole into which the socket is to be driven and to be retarded by said engagement so that the metal thereof will be extruded by said tapered portions of the hard metal shell, an integral flange extending from the outer end of the hard metal shell adapted to close the outer end of such a hole and to retain the extruded metal within the hole, and means within said shell of hard metal for receiving the threads of a bolt.

In testimony whereof I have hereunto set my hand this 26th day of March 1915, in the presence of two subscribing witnesses.

JOSEPH KENNEDY.

Witnesses:
    I. B. MOORE,
    E. G. SCHOENIG.

Copies of this patent may be obtained for five cents each, by addressing the "Commissioner of Patents, Washington, D. C."